United States Patent [19]
Yang et al.

[11] Patent Number: 5,977,230
[45] Date of Patent: Nov. 2, 1999

[54] POWDER AND BINDER SYSTEMS FOR USE IN METAL AND CERAMIC POWDER INJECTION MOLDING

[75] Inventors: Xiaoming Yang; Robert J. Petcavich, both of San Diego, Calif.

[73] Assignee: Planet Polymer Technologies, Inc., San Diego, Calif.

[21] Appl. No.: 09/006,471

[22] Filed: Jan. 13, 1998

[51] Int. Cl.⁶ .............................. C08J 3/05; C08K 3/08; C08K 3/10
[52] U.S. Cl. .................. 524/389; 264/645; 264/670; 264/344; 524/413; 524/430; 524/439; 524/440; 524/503; 525/57; 419/36; 419/37; 419/65
[58] Field of Search ................................. 524/401, 439, 524/524, 389, 440, 503, 430, 413; 525/57; 264/670, 645, 344

[56] References Cited

U.S. PATENT DOCUMENTS

| | | | |
|---|---|---|---|
| 4,283,360 | 8/1981 | Henmi | 264/670 |
| 4,681,629 | 7/1987 | Reinshagan | 75/246 |
| 4,704,242 | 11/1987 | Bandyofadhyay et al. | 264/234 |
| 4,765,950 | 8/1988 | Johnson | 264/670 |
| 4,867,943 | 9/1989 | Kiyota | 419/23 |
| 4,886,639 | 12/1989 | Andrees et al. | 419/28 |
| 4,891,399 | 1/1990 | Ohkawa et al. | 523/200 |
| 4,898,902 | 2/1990 | Nagai et al. | 524/275 |
| 4,923,652 | 5/1990 | Murakawa | 264/344 |
| 4,996,022 | 2/1991 | Shindo et al. | 419/2 |
| 5,002,728 | 3/1991 | Achikita et al. | 419/23 |
| 5,028,367 | 7/1991 | Wei et al. | 264/63 |
| 5,045,276 | 9/1991 | Kijima | 419/9 |
| 5,055,128 | 10/1991 | Kiyota et al. | 75/246 |
| 5,059,387 | 10/1991 | Brasel | 419/23 |
| 5,059,388 | 10/1991 | Kihara | 264/344 |
| 5,064,463 | 11/1991 | Ciomek | 75/314 |
| 5,095,048 | 3/1992 | Takahashi et al. | 523/223 |
| 5,098,469 | 3/1992 | Rezhets | 75/249 |
| 5,135,977 | 8/1992 | Achikita et al. | 524/83 |
| 5,266,264 | 11/1993 | Miura et al. | 419/37 |
| 5,332,537 | 7/1994 | Hens et al. | 264/496 |
| 5,338,508 | 8/1994 | Nitta et al. | 420/120 |
| 5,342,561 | 8/1994 | Sterzel et al. | 264/149 |
| 5,362,791 | 11/1994 | Ebenhoech et al. | 524/440 |
| 5,366,669 | 11/1994 | Quadir et al. | 264/16 |
| 5,366,679 | 11/1994 | Streicher et al. | 264/63 |
| 5,409,650 | 4/1995 | Holme | 264/63 |
| 5,421,853 | 6/1995 | Chen et al. | 75/252 |
| 5,439,964 | 8/1995 | Ohst et al. | 524/297 |
| 5,470,401 | 11/1995 | McCallum et al. | 148/302 |
| 5,531,958 | 7/1996 | Krueger | 419/44 |
| 5,604,919 | 2/1997 | Sterzel | 419/30 |
| 5,627,258 | 5/1997 | Takayama et al. | 528/338 |
| 5,641,920 | 6/1997 | Hens et al. | 75/228 |
| 5,665,289 | 9/1997 | Chung | 264/344 |

OTHER PUBLICATIONS

Schildknecht Calvin E., Vinyl and Related Polymers Joh Wiley & Sons, Inc., New York, 1952, pp. 351–352.

"Powder Injection Molding '96: Birth of an Industry", Carl Kirkland, Injection Molding Magazine, Jun. 1996, pp. 32–34, 36.

"What Is Metal Injection Molding?", Phillips–Origen Powder Metal Molding, date and author unknown, 2 pages of text and 2 sheets of illustrations.

*Primary Examiner*—James Derrington
*Attorney, Agent, or Firm*—Juettner Pyle Piontek & Underwood

[57] ABSTRACT

A powder injection molding composition or feedstock is made of 70% or more by weight of a powdered metal or ceramic and 30% or less by weight of a binder system. The binder system contains a sufficient amount of polypropylene or polyethylene to hold the so-called brown preform of the molded metal or ceramic powder together for the sintering step of the injection molding process and a sufficient amount of partially hydrolyzed cold water soluble polyvinyl alcohol, water and plasticizer to facilitate molding of the composition into the so-called green preform of the article to be manufactured. The debinding step of the injection molding process for transforming the green preform into the brown preform consists simply of immersing the green preform in water at ambient temperature to dissolve the polyvinyl alcohol. The binder system is nonhazardous, safe, harmless and fully degradable.

9 Claims, No Drawings

POWDER AND BINDER SYSTEMS FOR USE IN METAL AND CERAMIC POWDER INJECTION MOLDING

FIELD OF THE INVENTION

The present invention relates to powder injection molding of metals, alloys, ceramics, cermets and the like; to powder and binder systems for use therein; and, in particular, to an improved binder system.

BACKGROUND

Metal and ceramic powder injection molding is a low cost way to produce complex and precision-shaped parts from a variety of materials. It is common for this process to produce equivalent parts for 50% or less of the cost of conventional machining or casting. Total savings are a function of shape complexity, production volumes and overall size of the part.

There are four primary steps to producing powder injection molded parts or articles:

1. Feedstock Formulation: Very fine, usually less than 25 microns, elemental or prealloyed metal or ceramic powders are hot mixed with a polymeric binder. This mixture is then cooled and granulated to form the feedstock for an injection molding machine.

2. Molding: Molding is done in an especially equipped plastic injection molding machine modified to mold the powder/polymer mixture into an oversized shape of powder and binder called a "green part" or a "green preform". By virtue of powder injection molding, intricate detailed features can be molded into the oversized green preform, including threads, holes, radii, contoured surfaces, logos and text. The molding process produces the same shape every time, providing uniformity from part to part. Furthermore, the process produces virtually no waste.

3. Debinding: Seventy-five percent to ninety percent of the binder material is removed from the green part. Several different binder removal methods are used depending on the chemical and physical properties of the binder formulation used. These include thermal debinding, where a thermoplastic binder is baked out in an oven using elevated temperatures; solvent debinding, where the binder is dissolved using a chemical or water; and catalytic debinding, where the binder is reacted out by the introduction of a catalyst. After the binder is removed, the resulting object is called a "brown part" or "brown preform". It consists of a porous matrix of metal powder and a small amount of binder, just sufficient to allow the part to retain its shape and hold together.

4. Sintering: In the final step, the brown preform is sinternd in a furnace or oven through a complex profile of temperatures, pressures and/or atmospheres depending on the material being processed and the physical properties desired. A microprocessor controls these variables, ultimately bringing the part to within 96% of its melting point. At the lower temperatures of the sintering cycle, the residual binder is removed. As the temperatures increase, neck growth between powder particles begins, bringing the particles together and reducing porosity. The higher temperatures of the sintering profile continue this trend, ultimately densifying the metal to approximately 98%. Densification results in shrinkage of 14% to 25% depending on the solids loading of the feedstock and the alloy. This shrinkage is predictable and compensated for by oversizing the green part mold cavity by the precise amount.

Powder injection molded parts and articles are normally produced to finished dimensions in these four steps. The process is an innovative way to product complex shaped articles with consistency and accuracy. A variety of materials can be processed, including stainless steels and other materials that may be difficult to form in other ways. The process provides design flexibility and delivers tolerances of +/−0.002 to 0.003 inches per inch. Because the parts are sintered essentially to "full density", the parts produced by the process have properties which are virtually the same as those as wrought materials.

One aspect of the process that poses particular problems and hazards is the debinding step. Sufficient binder must be retained to provide a brown part that is stable and sufficiently strong to be handled and transported between the debinding and sintering steps, but the brown preform should not contain either a type of binder or an amount of binder that would hinder or impair the sintering step. Binding systems currently employed include a wax and polymer system which is thermally debound; a water soluble/cross linkable binder available from Thermat Precision Technology, Inc. under the trademark "Thermat Pristine" which is partly debound in water, cross-linked and thermally debound; a water and agar based binder available from Allied Signal; and an acetal based system available from BASF A.G. which is debound in a gaseous acid-containing atmosphere. The temperature and/or the duration of the debinding step in all of these systems is quite critical.

The BASF acetal-based system, which is described in U.S. Pat. No. 5,362,791 issued Nov. 8, 1994 to Ebenhoech et al. and other publications, has found particular application in the powder injection molding of stainless steel. In this system the polymer binder for the powder is polyoxymethylene and the acid employed for debinding the polymer is anhydrous nitric acid, which is an extremely hazardous substance creating serious environmental concerns.

SUMMARY OF THE INVENTION

The primary object of the present invention is to provide improved binder systems for use in practice of the powder injection molding process, and in particular binder systems that are economical, safe and environmentally friendly and that are not time or temperature sensitive for debinding of green parts.

A further object of the invention is to provide binder systems wherein the debinding step is performed simply by immersing the green part or preform of the article in water (or otherwise exposing the green preform to sufficient water for sufficient time) to dissolve a first, water soluble constituent of the binder and to retain a second constituent which is present in a predetermined amount just sufficient to impart the requisite strength to the debound or brown preform.

Another object of the invention is to provide as said second constituent of the binder a material which, upon sintering, will be readily and substantially completely released from the preform and vaporized so that the finished part ha will be fully densified, i.e., as close to 100% densified as possible.

In accordance with the invention, partially hydrolyzed cold water soluble polyvinyl alcohol is employed as the water soluble constituent of the binder to facilitate injection molding of the green part or preform, and polypropylene or polyethylene is employed as the vaporizable constituent that imparts the requisite strength to the brown part or preform and that also facilitates sintering of the same into a finished, fully densified end product.

Polyvinyl alcohol is a completely safe and harmless polymer. When dissolved in water, it is fully degradable, environmentally harmless and nonhazardous. At the same time, it is a polymer that can impact to the feedstock desired characteristics for injection molding of the green part or preform. Due to the presence of the second polymer constituent in the requisite amount, it is not necessary to retain any of the polyvinyl alcohol in the brown part. Consequently, the entirety of the polyvinyl alcohol can be dissolved out of the green preform by immersion in a water bath at ambient temperature, leaving behind only the second constituent and the powder. While a certain minimum duration of immersion in water is necessary to effect dissolution of the polyvinyl alcohol, the transformation from green state to brown state is not otherwise time or temperature sensitive. There is no critical cut-off time and dissolution occurs at room temperature.

Polypropylene and polyethylene likewise are completely safe and harmless polymers. When vaporized in the initial stages of the sintering step, they are fully degraded, environmentally harmless, and nonhazardous. Also, they are injection moldable polymers that impart the necessary characteristics to the feedstock to facilitate injection molding of the green preform. By virtue of the well known binding characteristics of polypropylene and polyethylene, and the ability of the powder molding art to ascertain in advance the amount of binder needed in the brown part, the amount of polypropylene or polyethylene required in a binding system for a given article of manufacture can be accurately predetermined. Also, because the vaporization characteristics of the polymers is known, the sintering temperature profile for a given article can be predetermined to provide for the proper rate of vaporization of the polymer to insure substantially complete vaporization of the polymer and substantially complete densification of the metal or ceramic article to its finished end product shape and dimensions.

The foregoing and other objects and advantages of the invention will become apparent to those of reasonable skill in the art from the following detailed description.

DETAILED DESCRIPTION OF PREFERRED EMBODIMENTS

The following is a description of certain preferred embodiments of the invention presently deemed by the inventors to be the best mode of carrying out their invention.

In accordance with the invention, a feedstock for injection molding of a metal, ceramic or like powder is comprised in major part of the powder and in minor part of a polymer binding system comprised of polyvinyl alcohol ("PVOH"), polypropylene ("PP") or polyethylene ("PE"), and appropriate processing aids, especially plasticizer.

The powder to be molded may be an elemental metal, a metallic alloy, a ceramic, a cermet, an intermetallic or a composite. Examples include iron and alloys of iron, steels such as tool steel and stainless steel, copper and copper alloys, molybdenum, tungsten and heavy metal alloys, titanium and titanium alloys, alumina, zirconia, cemented carbides, aluminum nitride, silicon nitride, silicon carbide, and the like. For purposes of the present disclosure, all of these materials are incorporated within the term "metal or ceramic".

The metal or ceramic powder is micron sized, customarily about 25 microns or less. In accordance with the invention, the proportion of the powder in the feed stock is at least about 70% by weight, preferably 80% or more, and most preferably 90% or more by weight.

The binder system for the feedstock is comprised of the predetermined amount of PP or PE required to impart the requisite strength to the brown part or preform and the amount of PVOH required for effective and convenient injection molding of the green part or preform.

The PVOH employed in practice of the invention is a partially hydrolyzed water soluble species of the alcohol, preferably one that is about 87% hydrolyzed and cold water soluble, such as the partially hydrolyzed polyvinyl alcohol available from DuPont under the brand name "Elvanol" and the grade designation 51-05. The ratio of PVOH to PP or PE will be in the range of from about 1 to about 9 parts PVOH to about 1 part PP or PE.

The feedstock may also include processing aids, notably one or more of a plasticizer, a release agent and, optionally, a debinding agent. Preferred plasticizers include water and glycerin; a preferred release agent is "Mold Wiz" INT-33PA available from Axel Plastics Research Laboratories, Inc; and a preferred debinding agent or aid is stearic acid.

In accordance with the invention, the binder system in its preferred embodiments is comprised of from about 38 to about 67 parts by weight of PVOH, from about 8 to about 32 parts by weight of PP or PE, and from about 25 to about 35 parts by weight of processing aids. The processing aids preferably comprise from about 3 to about 19 parts by weight of water, from about 9 to about 19 parts by weight of glycerin or other suitable plasticizer, from about 3 to about 6 parts by weight of a release agent and, optionally, from about 3 to about 5 parts by weight of a debinding aid.

In an injection molding composition or feedstock formulated in accordance with the invention and comprising at least about 70% by weight of a metal or ceramic powder and 30% or less by weight of binder, the binder constituents in the molding composition comprise from about 2 to about 25% by weight of PVOH, from about 0.25 to about 10 percent by weight of PP or PE, from about 0.5 to about 5% by weight of a plasticizer such as glycerin, from about 0.1 to about 10% by weight of water, from about 0.1 to about 2% by weight of a release agent, and optionally, from about 0.1 to about 2% by weight of a debinding aid.

In a more preferred injection molding composition or feedstock, the powdered metal or ceramic comprises 80% or more, and preferably 90% or more by weight of the composition, and the binder constituents in the composition preferably comprise from about 4 to about 6% by weight of PVOH, from about 0.5 to about 7% by weight of PP or PE, from about 1 to about 2% by weight of glycerin, from about 0.3 to about 5% by weight of water, from about 0.2 to about 0.6 percent by weight of a release agent and, optionally, from about 0.3 to about 0.5% by weight of a debinding aid.

Molding compositions formulated in accordance with the foregoing have high melt indices and therefore afford the advantage of facilitating injection molding of highly complex and intricate articles of manufacture and end products.

Because stainless steel is currently the leading material being injection molded, the following are given as examples of preferred formulations of stainless steel molding compositions:

| Formula I | |
|---|---|
| Stainless Powder | 91.16 Wt. % |
| Polyvinyl Alcohol | 5.874 |
| Glycerin | 1.63 |
| Water | 0.41 |
| INT-33PA Release | 0.229 |
| Polypropylene | 0.687 |
| Formula II | |
| Stainless Powder | 91.622 Wt. % |
| Polyvinyl Alcohol | 4.867 |
| Glycerin | 1.352 |
| Water | 0.3395 |
| INT-33PA Release | 0.1899 |
| Polypropylene | 1.31 |
| Stearic Acid | 0.32 |
| Formula III | |
| Stainless Powder | 91.35 Wt. % |
| Polyvinyl Alcohol | 5.25 |
| Glycerin | 1.46 |
| Water | 0.366 |
| INT-33PA Release | 0.551 |
| High Density Polyethylene | 1.023 |

The constituents of the molding compositions or feedstocks described are preferably mixed and compounded within and formed into injection molding pellets by passage through a twin screw extruder. Typical extruder temperature profiles, in degrees Fahrenheit, are 200, 340, 380, 360–380 and 350–370° F. Feed rates are typically 130–150 RPM and screw speed is typically 300 RPM (revolutions per minute).

When processed in this manner, the stainless steel formulations above described, have the following melt indices: Formula I=3.3, Formula II=2.2, Formula III=12.

The molding composition pellets thus formed are then injection molded pursuant to standard practices in the powder injection molding art to produce a green preform. The green preform will typically comprise an object having the same shape as the end product or article, but of significantly larger size.

The green preform is thereafter immersed in water at ambient temperature for a duration of time sufficient (or is otherwise exposed to a sufficient amount of water for a sufficient amount of time) to dissolve the PVOH out of the green preform, thereby transforming the object into a brown preform consisting of a porous mixture of the metal or ceramic powder and an amount of PP or PE sufficient to hold the preform together and to permit handling and transport of the same to the sintering furnace or oven.

The sintering step of the process is carried out according to standards conventional in the art, which usually involve a fairly complex profile of temperatures, pressures and/or atmospheres. At the lower temperatures in the sintering cycle, the PP or PE in the brown preform is vaporized harmlessly into an inert or hydrogen atmosphere within the furnace, whereafter sintering and densification of the preform continues until the object is fully densified and reduced to its final shape, size and dimensions.

The present invention therefore impacts only on the formulation of the binding system and the debinding of the green preform or part. Compounding, pelletizing, molding and sintering are carried out in essentially conventional manners. It is in the debinding step that the invention exhibits its primary advantages and where the invention improves dramatically on the prior art. In particular, debinding no longer requires time, temperature and/or atmosphere sensitive procedures. The invention completely eliminates the use of hazardous and environmentally harmful acids and like chemicals; it eliminates the need for specially designed and constructed process vessels capable of withstanding attack from gaseous acid-containing debinding agents; and it significantly reduces the expense and criticality of the debinding process. Instead, the present invention employs completely safe and harmless binding agents that are fully degradable and provides a debinding process that is simple, safe, inexpensive and nonhazardous, and that full satisfies environmental concerns.

The objects and advantages of the invention have therefore been shown to be attained in a convenient, economical, practical and facile manner.

While preferred embodiments of the invention have been herein described, it is to be appreciated that variations, changes, rearrangements and modifications may be made therein without departing from the scope of the invention as defined by the appended claims.

What is claimed is:

1. A powder injection molding composition comprising from about 70% or more by weight of a powdered metal or ceramic and from about 30% or less by weight of a binder system, said binder system comprising a mixture of from about 8 to about 32 parts by weight polypropylene or polyethylene, from about 38 to about 67 parts by weight partially hydrolyzed cold water soluble polyvinyl alcohol, from about 3 to about 19 parts by weight water, and from about 9 to about 19 parts by weight plasticizer.

2. A molding composition as set forth in claim 1 comprising at least about 80% by weight of a powdered metal or ceramic and no more than about 20% by weight of the binder system.

3. A powder injection molding composition comprising at least about 70% by weight of a powdered metal or ceramic, from about 2 to about 25% by weight of partially hydrolyzed cold water soluble polyvinyl alcohol, from about 0.25 to about 10% by weight of polypropylene or polyethylene, from about 0.5 to about 5% by weight of plasticizer, from about 0.1 to about 10% by weight of water, and from about 0.1 to about 2 % by weight of a release agent.

4. A molding composition as set forth in claim 3 further comprising from about 0.1 to about 2% by weight of a debinding aid.

5. A molding composition as set forth in claim 3 comprising at least about 80% by weight of a powdered metal or ceramic, from about 4 to about 6% by weight of polyvinyl alcohol, from about 0.5 to about 7% by weight of polypropylene or polyethylene, from about 1 to about 2% by weight of plasticizer, from about 0.3 to about 5% by weight of water, and from about 0.2 to about 0.6% by weight of a release agent.

6. A molding composition as set forth in claim 5 further comprising from about 0.3 to about 0.5% by weight of a debinding aid.

7. A molding composition as set forth in claim 5 comprising about 90% or more by weight of a powdered metal or ceramic.

8. A molding composition as set forth in claim 3 wherein the plasticizer is glycerin.

9. A molding composition as set forth in claim 3 having a melt index of from about 2 to about 12.

* * * * *